(12) United States Patent
Back et al.

(10) Patent No.: US 11,877,338 B2
(45) Date of Patent: Jan. 16, 2024

(54) METHOD AND APPARATUS FOR HANDLING LINK FAILURE IN WIRELESS COMMUNICATION SYSTEM

(71) Applicant: LG ELECTRONICS INC., Seoul (KR)

(72) Inventors: Seoyoung Back, Seoul (KR); Giwon Park, Seoul (KR); Seungmin Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 258 days.

(21) Appl. No.: 17/451,795

(22) Filed: Oct. 21, 2021

(65) Prior Publication Data
US 2022/0132614 A1 Apr. 28, 2022

(30) Foreign Application Priority Data
Oct. 22, 2020 (KR) .................. 10-2020-0137633

(51) Int. Cl.
| H04W 4/00 | (2018.01) |
| H04W 76/18 | (2018.01) |
| H04W 48/16 | (2009.01) |
| H04W 76/38 | (2018.01) |
| H04W 8/00 | (2009.01) |
| H04W 76/28 | (2018.01) |

(52) U.S. Cl.
CPC ........... H04W 76/18 (2018.02); H04W 8/005 (2013.01); H04W 48/16 (2013.01); H04W 76/38 (2018.02); H04W 76/28 (2018.02)

(58) Field of Classification Search
CPC ..... H04W 76/18; H04W 48/16; H04W 76/28; H04W 76/38; H04W 8/00; H04W 8/005
USPC .......................................................... 370/329
See application file for complete search history.

(56) References Cited

U.S. PATENT DOCUMENTS

| | | | |
|---|---|---|---|
| 11,523,354 B2 * | 12/2022 | Akkarakaran | .... H04W 56/0025 |
| 2014/0269646 A1 * | 9/2014 | Ramasamy | ........... H04W 76/14 370/338 |
| 2020/0100154 A1 * | 3/2020 | Cirik | ................. H04W 36/0072 |
| 2020/0221485 A1 * | 7/2020 | Cirik | .................... H04L 25/0226 |
| 2020/0351705 A1 * | 11/2020 | Chae | ...................... H04L 5/0051 |
| 2020/0351729 A1 * | 11/2020 | Rastegardoost | .. H04W 36/0072 |
| 2020/0351859 A1 * | 11/2020 | Chae | ....................... H04W 72/20 |
| 2021/0289553 A1 * | 9/2021 | Ozturk | .............. H04W 74/0816 |
| 2021/0297199 A1 * | 9/2021 | Miao | .................... H04B 7/0695 |
| 2022/0078685 A1 * | 3/2022 | Ly | ...................... H04W 36/0058 |
| 2022/0303969 A1 * | 9/2022 | Hwang | ................ H04W 72/20 |
| 2023/0164816 A1 * | 5/2023 | Hwang | ................ H04L 1/1816 370/330 |
| 2023/0180343 A1 * | 6/2023 | Park | ..................... H04W 76/28 370/311 |
| 2023/0199809 A1 * | 6/2023 | Park | .................... H04W 72/566 370/329 |

(Continued)

*Primary Examiner* — Marceau Milord
(74) *Attorney, Agent, or Firm* — LEE, HONG, DEGERMAN, KANG & WAIMEY

(57) ABSTRACT

The present disclosure relates to handling a link failure in a wireless communication system. According to an embodiment of the present disclosure, a first wireless device may receive a preliminary radio link failure (pre-RLF) indication from a second wireless device, and perform proper actions upon receiving the pre-RLF indication.

15 Claims, 16 Drawing Sheets

(56) References Cited

U.S. PATENT DOCUMENTS

2023/0209430 A1\*  6/2023  Hong .................... H04W 76/14
                                                370/331
2023/0247519 A1\*  8/2023  Hong .................... H04W 40/22
                                                370/315

\* cited by examiner

METHOD AND APPARATUS FOR HANDLING LINK FAILURE IN WIRELESS COMMUNICATION SYSTEM

CROSS-REFERENCE TO RELATED APPLICATIONS

Pursuant to 35 U.S.C. § 119 (a), this application claims the benefit of earlier filing date and right of priority to Korean Patent Application No. 10-2020-0137633, filed on Oct. 22, 2020, the contents of which are all hereby incorporated by reference herein in their entirety.

BACKGROUND OF THE DISCLOSURE

Field of the Disclosure

This disclosure relates to handling a link failure in a wireless communication system.

Related Art

A wireless communication system is a multiple access system supporting a communication with multiple users by sharing available system resources (e.g., bandwidth, transmission power, etc.). Examples of the multiple access system may comprise a code division multiple access (CDMA) system, frequency division multiple access (FDMA) system, time division multiple access (TDMA) system, orthogonal frequency division multiple access (OFDMA) system, single carrier frequency division multiple access (SC-FDMA) system and/or multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

In wireless communications, communication link between UE and another node may be degraded due to various reasons such as mobility of the UE. For example, sidelink between the UE and another UE may be degraded. For another example, access link between the UE and BS may be degraded. If the link quality becomes bad, the UE may declare a radio link failure (RLF). Whenever the RLF is declared, proper handling may be required.

SUMMARY OF THE DISCLOSURE

Technical Objects

An aspect of the present disclosure is to provide method and apparatus for handling a link failure in a wireless communication system.

Another aspect of the present disclosure is to provide method and apparatus for detecting the link failure in advance in a wireless communication system.

Yet another aspect of the present disclosure is to provide method and apparatus for reporting the link failure in advance in a wireless communication system.

Technical Solutions

According to an embodiment of the present disclosure, a method performed by a first wireless device in a wireless communication system comprises: receiving, from a second wireless device over a first link, information informing a preliminary radio link failure (RLF) detected on a second link; upon receiving the information informing the preliminary RLF, transmitting discovery messages for searching one or more other wireless devices; and establishing a connection with a third wireless device among the one or more other wireless devices, wherein the preliminary RLF is detected on the second link based on that a relaxed condition with respect to the RLF condition for detecting an RLF on the second link is satisfied, wherein the first link is a link between the first wireless device and the second wireless device, and wherein the second link is a link between the second wireless device and a node other than the first wireless device.

According to an embodiment of the present disclosure, a wireless device in a wireless communication system comprises: a transceiver; a memory; and at least one processor operatively coupled to the transceiver and the memory, and configured to: control the transceiver to receive, from a second wireless device over a first link, information informing a preliminary radio link failure (RLF) detected on a second link; upon receiving the information informing the preliminary RLF, control the transceiver to transmit discovery messages for searching one or more other wireless devices; and establish a connection with a third wireless device among the one or more other wireless devices, wherein the preliminary RLF is detected on the second link based on that a relaxed condition with respect to the RLF condition for detecting an RLF on the second link is satisfied, wherein the first link is a link between the first wireless device and the second wireless device, and wherein the second link is a link between the second wireless device and a node other than the first wireless device.

According to an embodiment of the present disclosure, a non-transitory computer-readable medium has stored thereon a plurality of instructions, wherein the plurality of instructions, when executed by a processor of a wireless device, cause the wireless device to: receive, from a second wireless device over a first link, information informing a preliminary radio link failure (RLF) detected on a second link; upon receiving the information informing the preliminary RLF, transmit discovery messages for searching one or more other wireless devices; and establish a connection with a third wireless device among the one or more other wireless devices, wherein the preliminary RLF is detected on the second link based on that a relaxed condition with respect to the RLF condition for detecting an RLF on the second link is satisfied, wherein the first link is a link between the first wireless device and the second wireless device, and wherein the second link is a link between the second wireless device and a node other than the first wireless device.

According to an embodiment of the present disclosure, a processor for a first wireless device in a wireless communication system may execute instructions which are implemented by a software code stored in a memory of the first wireless device. The instructions may, when executed by the processor, perform operations comprising: receiving, from a second wireless device over a first link, information informing a preliminary radio link failure (RLF) detected on a second link; upon receiving the information informing the preliminary RLF, transmitting discovery messages for searching one or more other wireless devices; and establishing a connection with a third wireless device among the one or more other wireless devices. The preliminary RLF may be detected on the second link based on that a relaxed condition with respect to the RLF condition for detecting an RLF on the second link is satisfied. The first link may be a link between the first wireless device and the second wireless device. The second link may be a link between the second wireless device and a node other than the first wireless device.

Effects of the Disclosure

According to various embodiments, a remote UE can search a new link before a link failure occurs so that a service continuity, latency and/or reliability can be enhanced.

DESCRIPTION OF EXEMPLARY EMBODIMENTS

Figure 1:
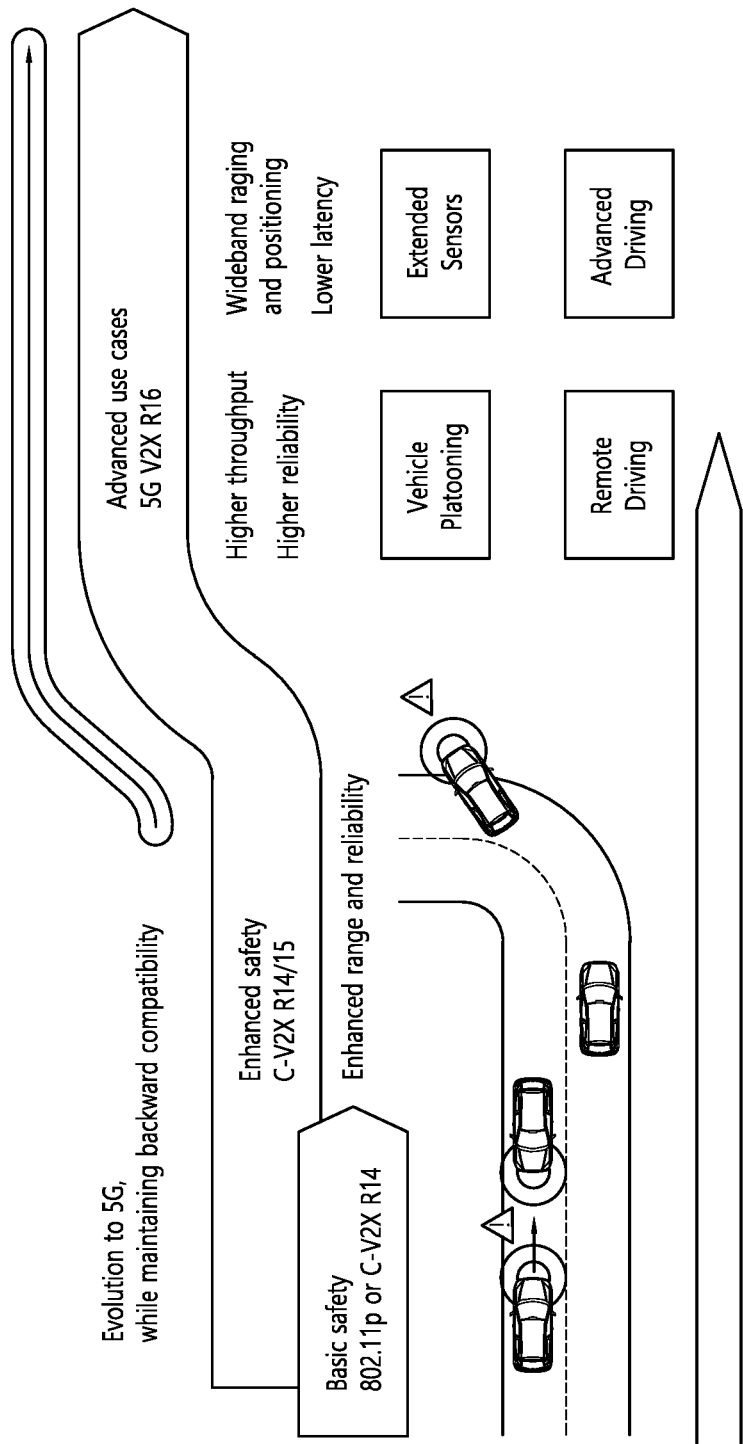
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
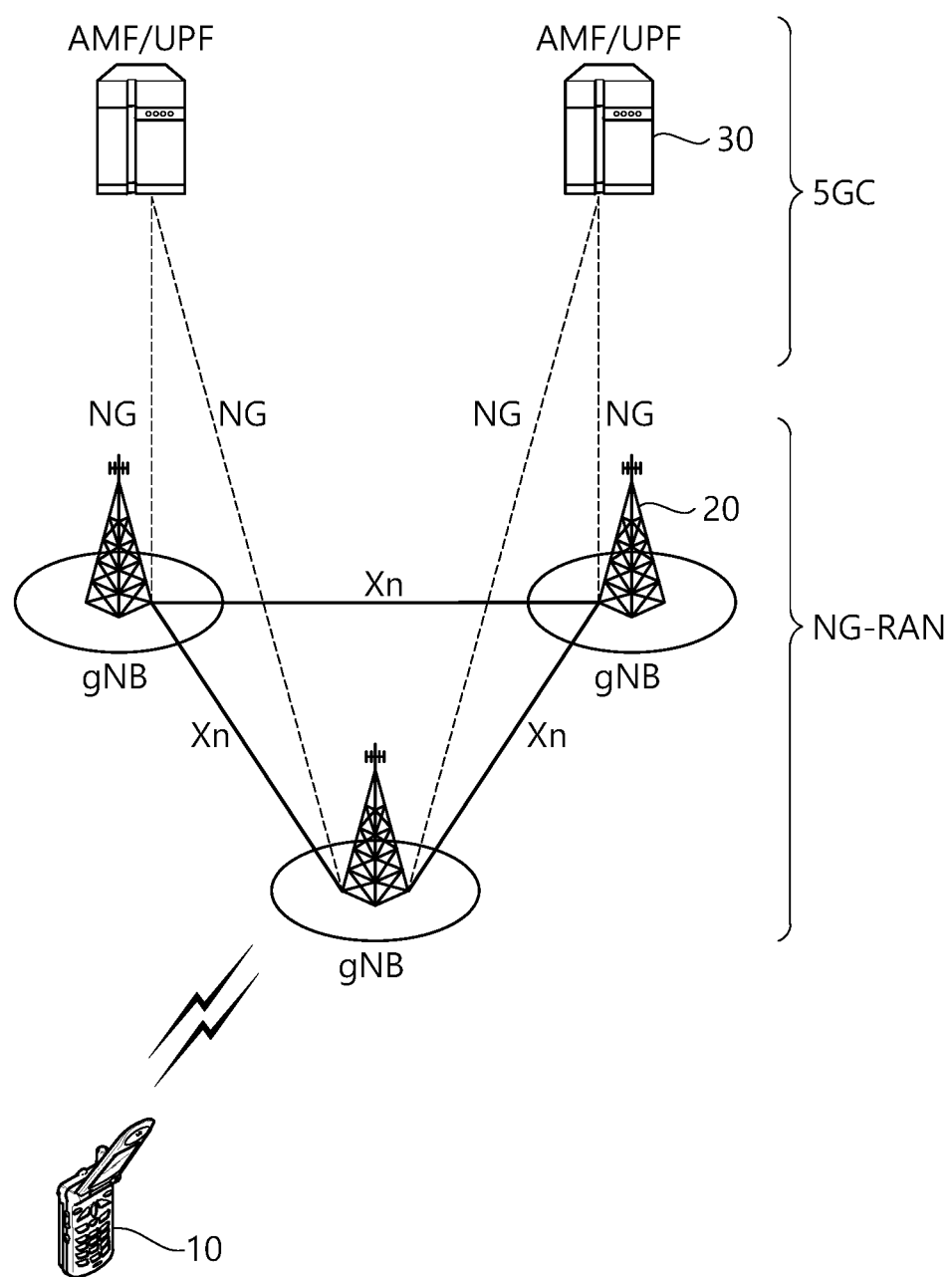
FIG. 2 shows a structure of an NR system, according to an embodiment of the present disclosure.

FIG. 2 shows a structure of an NR system, according to an embodiment of the present disclosure. The embodiment of FIG. 2 may be combined with various embodiments of the present disclosure.

Referring to FIG. 2, a next generation-radio access network (NG-RAN) may include a B S 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
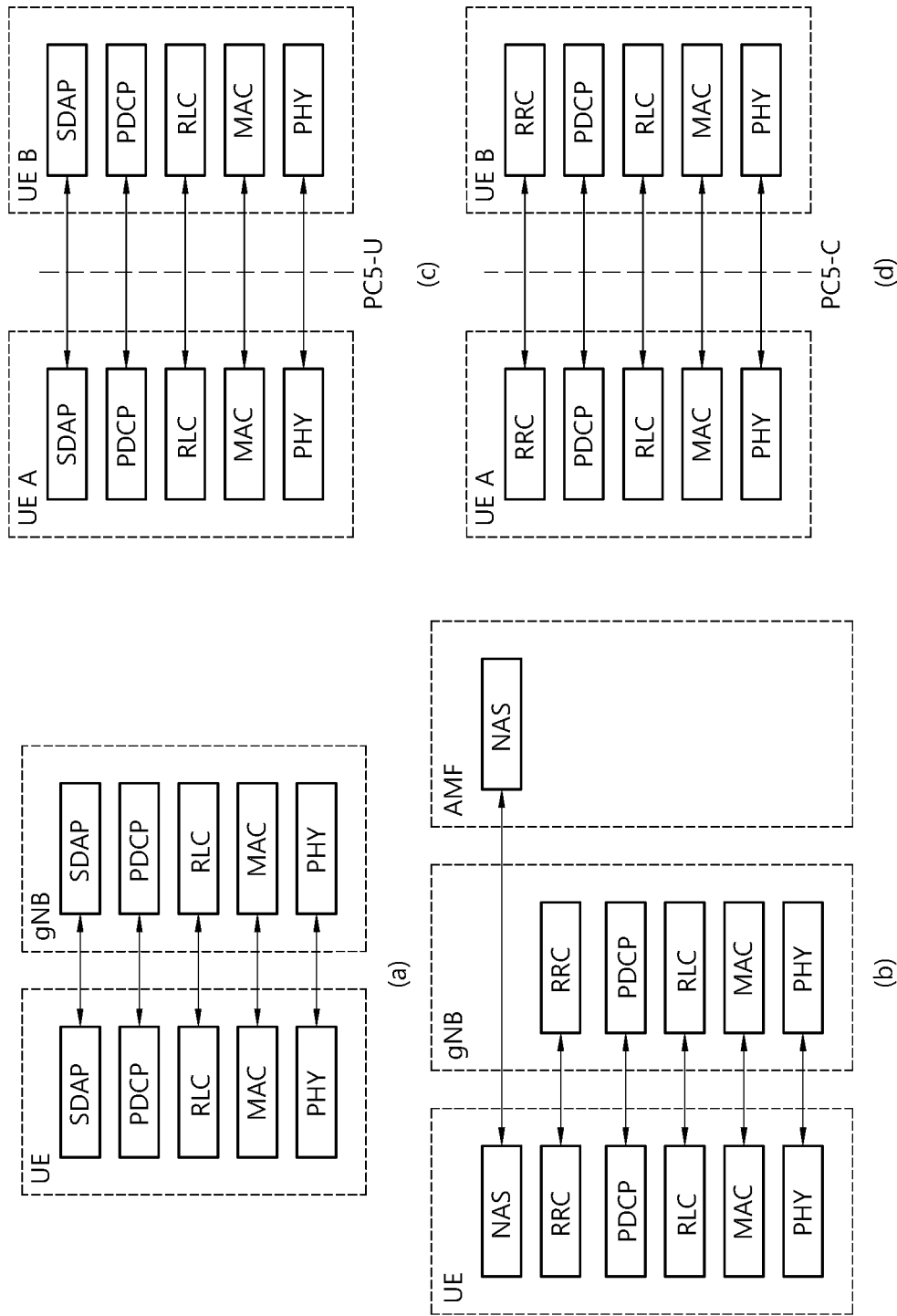
FIG. 3 shows a radio protocol architecture, according to an embodiment of the present disclosure.

FIG. 3 shows a radio protocol architecture, according to an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
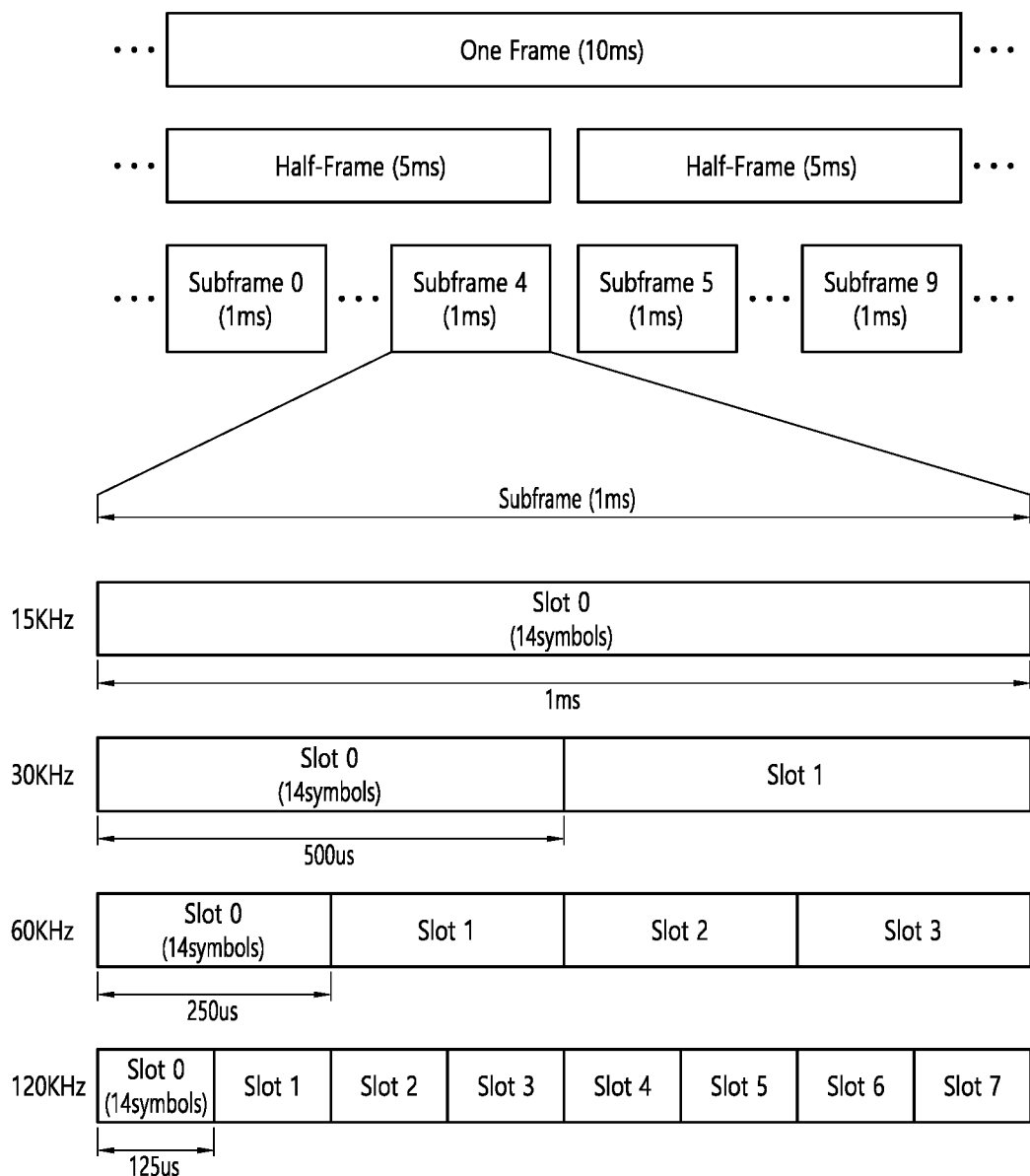
FIG. 4 shows a structure of a radio frame of an NR, according to an embodiment of the present disclosure.

FIG. 4 shows a structure of a radio frame of an NR, according to an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
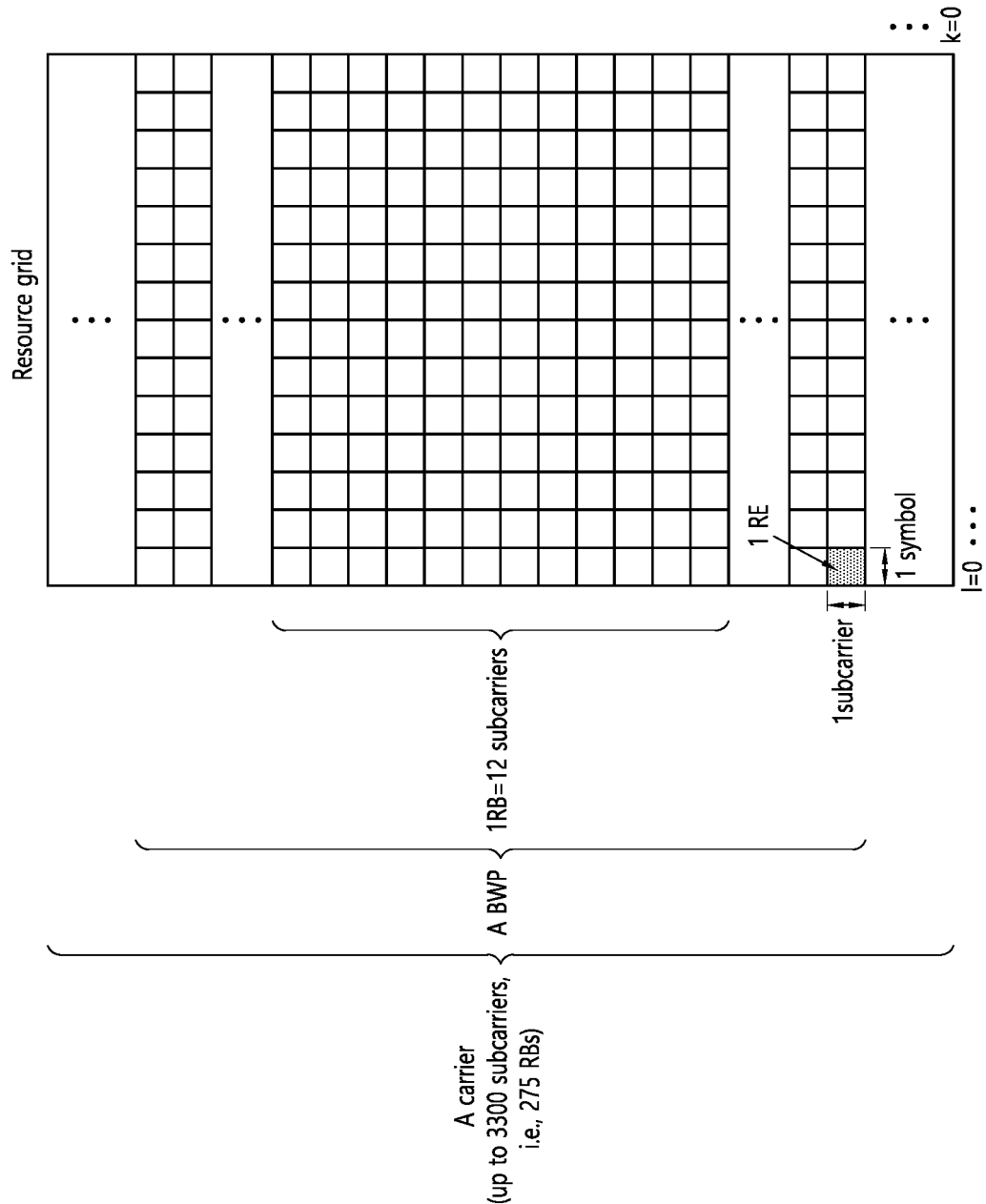
FIG. 5 shows a structure of a slot of an NR frame, according to an embodiment of the present disclosure.

FIG. 5 shows a structure of a slot of an NR frame, according to an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or SL communication will be described.

Figure 6:
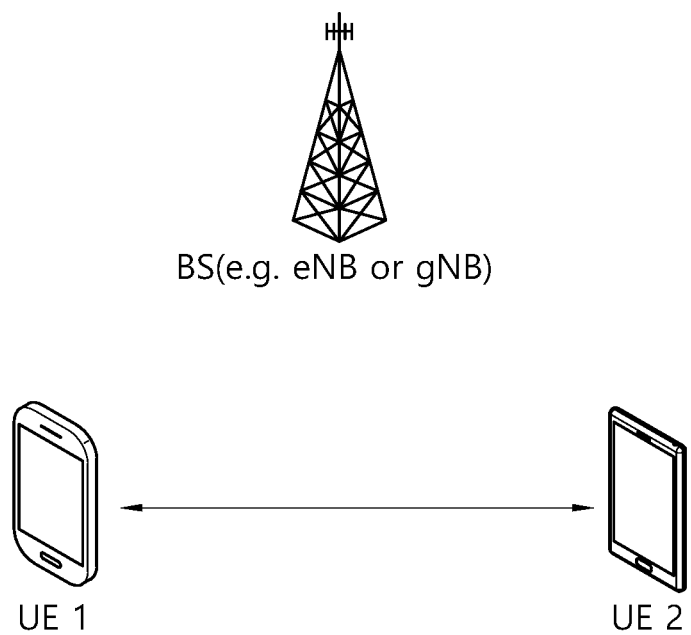
FIG. 6 shows a UE performing V2X or SL communication, according to an embodiment of the present disclosure.

FIG. 6 shows a UE performing V2X or SL communication, according to an embodiment of the present disclosure. The embodiment of FIG. 6 may be combined with various embodiments of the present disclosure.

Referring to FIG. 6, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

For example, the resource pool may comprise a discovery channel. The discovery channel may be a resource pool for the TX UE to transmit information such as ID of the TX UE. By transmitting the information on the discovery channel, the TX UE may enable a neighbor UE to discover the TX UE.

The UE 2 may perform an indirect communication with the BS via the UE 1. The indirect communication may be performed via an access link (or, Uu link) between the UE 1 and the BS, and a sidelink between the UE 1 and the UE 2. The UE 1 may relay a signal transfer between the BS and the UE 2. In this case, the UE 1 may be referred to as a relay UE, and the UE 2 may be referred to as a remote UE. If the UE 2 performs an indirect communication with the BS via the UE 1, a connection between the UE 2 and the BS may be referred to as an indirect connection.

For example, the remote UE may be in-coverage of the BS. In this case, the remote UE may be in-coverage of the same BS as the relay UE, or different BS.

For another example, the remote UE may be out-of-coverage of the BS.

The UE 2 may perform a direct communication with the BS without a signal relay by the UE 2. The direct communication may be performed as an access link (or, Uu link) between the UE 2 and the BS. If the UE 2 performs a direct communication with the BS, a connection between the UE 2 and the BS may be referred to as a direct connection.

To synchronize the UE 1 and the UE 2, one UE may transmit Sidelink Synchronization Signal (SLSS) to the other UE. The sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Hereinafter, resource allocation in SL will be described.

Figure 7:
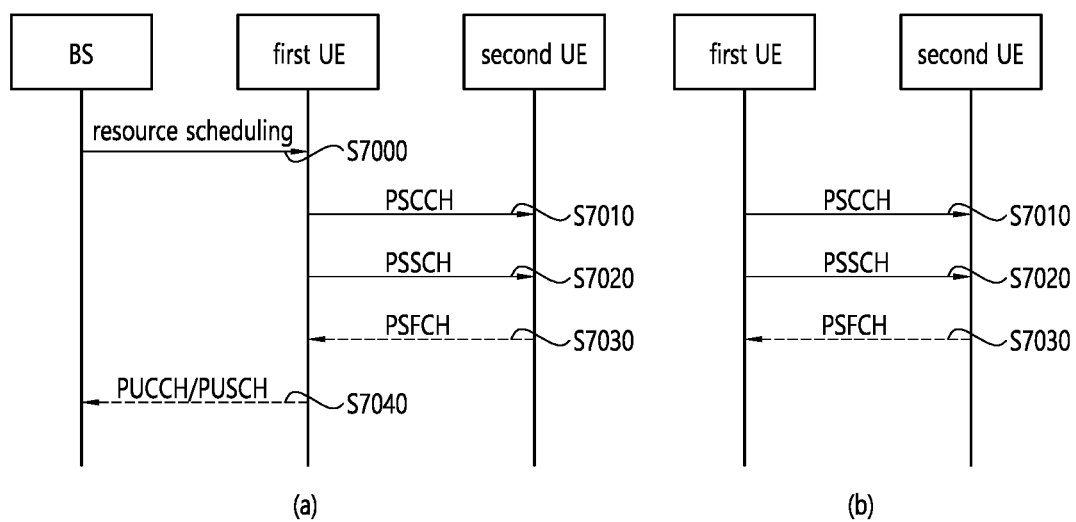
FIG. 7 shows a procedure of performing V2X or SL communication by a UE according to a transmission mode, based on an embodiment of the present disclosure.

FIG. 7 shows a procedure of performing V2X or SL communication by a UE based on a transmission mode, according to an embodiment of the present disclosure. The embodiment of FIG. 7 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 7 shows a UE operation related to an LTE transmission mode 1 or an LTE transmission mode 3. Alternatively, for example, (a) of FIG. 7 shows a UE operation related to an NR resource allocation mode 1. For example, the LTE transmission mode 1 may be applied to general SL communication, and the LTE transmission mode 3 may be applied to V2X communication.

For example, (b) of FIG. 7 shows a UE operation related to an LTE transmission mode 2 or an LTE transmission mode 4. Alternatively, for example, (b) of FIG. 7 shows a UE operation related to an NR resource allocation mode 2.

Referring to (a) of FIG. 7, in LTE transmission mode 1, LTE transmission mode 3 or NR resource allocation mode 1, the BS may schedule SL resources to be used by UE for SL transmission. For example, in step S7000, the BS may transmit, to the first UE, information related to SL resource and/or information related to UL resource. For example, the UL resource may comprise PUCCH resource and/or PUSCH resource. For example the UL resource may be a resource for reporting a SL HARQ feedback to the BS.

For example, the first UE may receive information related to dynamic grant (DG) resource and/or information related to configured grant (CG) resource, from the BS. For example, the CG resource may comprise CG type 1 resource or CG type 2 resource. In the disclosure, the DG resource may be a resource the BS allocates/configures to the first UE via downlink control information (DCI). In the disclosure, the CG resource may be a (periodic) resource the BS allocates/configures to the first UE via DCI and/or RRC message. For example, in case of the CG type 1 resource, the BS may transmit RRC message including information related to the CG resource to the first UE. For example, in case of CG type 2 resource, the BS may transmit RRC message including the information related to the CG resource to the first UE, and the BS may transmit DCI related to activation or deactivation of the CG resource to the first UE.

In step S7010, the first UE may transmit, to the second UE, PSCCH (e.g., SCI or 1st-stage SCI) based on the resource scheduling. In step S7020, the first UE may transmit, to the second UE, PSSCH (e.g., 2nd-stage SCI, MAC PDU, data) related to PSCCH. In step S7030, the first UE may receive, from the second UE, PSFCH related to PSCCH/PSSCH. For example, HARQ feedback information (e.g., NACK information or ACK information) may be received from the second UE via the PSFCH. In step S7040, the first UE may transmit/report, to the BS, the HARQ feedback information via PUCCH or PUSCH. For example, the HARQ feedback information reported to the BS may be information generated by the first UE based on the HARQ feedback information received from the second UE. For example, the HARQ feedback information reported to the BS may be information generated by the first UE based on a pre-configured rule. For example, the DCI may be DCI for SL scheduling. For example, a format of the DCI may be DCI format 3_0 or DCI format 3_1.

Referring to (b) of FIG. 7, in LTE transmission mode 2, LTE transmission mode 4 or NR resource allocation mode 2, UE may determine SL transmission resource in SL resource configured by BS/network or pre-configured SL resource. For example, the configured SL resource or the pre-configured SL resource may be a resource pool. For example, UE may autonomously select or schedule resource for SL transmission. For example, the UE may autonomously select resources in the configured resource pool and perform SL communication. For example, the UE may perform sensing and resource (re)selection procedure, and autonomously select resources in a selection window. For example, the sensing may be performed based on a subchannel unit. For example, in step S7010, the first UE which autonomously selected resources in the resource pool may transmit, to the second UE, PSCCH (e.g., SCI or $1^{st}$-stage SCI) using the resources. In step S7020, the first resource may transmit, to the second UE, PSSCH (e.g., 2nd-stage SCI, MAC PDU, data) related to PSCCH. In step S7030, the first UE may receive, from the second UE, PSFCH related to PSCCH/PSSCH.

Referring to (a) or (b) of FIG. 7, for example, the first UE may transmit, to the second UE, SCI on PSCCH. Or, for example, the first UE may transmit, to the second UE, two consecutive SCIs (e.g., 2-stage SCI) on the PSCCH and/or PSSCH. In this case, the second UE may decode two consecutive SCIs (e.g., 2-stage SCI) for receiving the PSSCH from the first UE. In the disclosure, SCI transmitted on the PSCCH may be referred to as $1^{st}$ SCI, first SCI, $1^{st}$-stage SCI or $1^{st}$-stage SCI format. The SCI transmitted on the PSSCH may be referred to as $2^{nd}$ SCI, second SCI, $2^{nd}$-stage SCI or $2^{nd}$-stage SCI format. For example, the $1^{st}$-stage SCI format may comprise SCI format 1-A, and the $2^{nd}$-stage SCI format may comprise SCI format 2-A and/or SCI format 2-B.

Referring to (a) or (b) of FIG. 7, in step S7030, the first UE may receive PSFCH from the second UE. For example, the first UE and/or the second UE may determine PSFCH resource, and the second UE may transmit HARQ feedback using the PSFCH resource to the first UE.

Referring to (a) of FIG. 7, in step S7040, the first UE may transmit SL HARQ feedback via PUCCH and/or PUSCH to the BS.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since TX UE may transmit at least one of SCI, first SCI or second SCI via PSCCH to RX UE, PSCCH may be substituted for/replaced with at least one of the SCI, the first SCI or the second SCI. And/or, for example, SCI may be substituted for/replaced with at least one of PSCCH, first SCI or second SCI. And/or, for example, since TX UE may transmit second SCI via PSSCH to RX UE, the PSSCH may be substituted for/replaced with the second SCI.

Hereinafter, Sidelink RLF detection is described.

For example, the sidelink RLF detection may comprise HARQ-based sidelink RLF detection. The HARQ-based Sidelink RLF detection procedure is used to detect Sidelink RLF based on a number of consecutive DTX on PSFCH reception occasions for a PC5-RRC connection.

RRC configures the following parameter to control HARQ-based Sidelink RLF detection:

sl-maxNumConsecutiveDTX

The following UE variable is used for HARQ-based Sidelink RLF detection.

numConsecutiveDTX, which is maintained for each PC5-RRC connection.

The Sidelink HARQ Entity shall (re-)initialize numConsecutiveDTX to zero for each PC5-RRC connection which has been established by upper layers, if any, upon establishment of the PC5-RRC connection or (re)configuration of sl-maxNumConsecutiveDTX The Sidelink HARQ Entity shall for each PSFCH reception occasion associated to the PSSCH transmission:

1> if PSFCH reception is absent on the PSFCH reception occasion:

2> increment numConsecutiveDTX by 1;

2> if numConsecutiveDTX reaches sl-maxNumConsecutiveDTX

3> indicate HARQ-based Sidelink RLF detection to RRC.

1> else:

2> re-initialize numConsecutiveDTX to zero.

That is, if the number of consecutive DTXs in TX UE reaches a threshold number, the TX UE may declare/report a radio link failure (RLF) to gNB. If the TX UE declares/reports RLF, BS may perform related actions such as reconfiguration of resources. By using the HARQ-based sidelink RLF detection, communication problem can be detected much earlier than a keep-alive operation in which communication problem is detected based on a timer configured by a higher layer.

Hereinafter, Uu link or access link RLF detection is described.

The UE shall:

1> if any DAPS bearer is configured, upon receiving N310 consecutive "out-of-sync" indications for the source SpCell from lower layers and T304 is running:

2> start timer T310 for the source SpCell.

1> upon receiving N310 consecutive "out-of-sync" indications for the SpCell from lower layers while neither T300, T301, T304, T311, T316 nor T319 are running:

2> start timer T310 for the corresponding SpCell.

Upon receiving N311 consecutive "in-sync" indications for the SpCell from lower layers while T310 is running, the UE shall:

1> stop timer T310 for the corresponding SpCell.

1> stop timer T312 for the corresponding SpCell, if running.

The UE shall:

1> if any DAPS bearer is configured and T304 is running:

2> upon T310 expiry in source SpCell; or

2> upon random access problem indication from source MCG MAC; or

2> upon indication from source MCG RLC that the maximum number of retransmissions has been reached; or 2> upon consistent uplink LBT failure indication from source MCG MAC:

3> consider radio link failure to be detected for the source MCG i.e. source RLF;

3> suspend the transmission of all DRBs in the source MCG;

3> reset MAC for the source MCG;

3> release the source connection.

That is, Uu link RLF may be declared if i) consecutive out-of-synchronization (sync) indications of a threshold out-of-sync number (e.g., N310) are identified for a cell related to the base station, upon which an RLF timer (e.g., T310 timer) starts, ii) consecutive in-sync indications of a threshold in-sync number (e.g., N311) are not identified for the cell related to the base station while the RLF timer is running, and iii) the RLF timer expires. Uu link RLF may be declared if a random access problem is identified for the cell related to the base station. Uu link RLF may be declared if a maximum number of retransmissions has been reached for the cell related to the base station (i.e., ACK signal is not received until the maximum number of retransmissions has been reached for the cell related to the base station).

In the present disclosure, in UE-to-network/UE-to-UE relay operation, a relay UE may transmit a preliminary RLF (pre-RLF) or RLF-warning signal to a remote UE before an actual RLF is declared so that the remote UE can perform appropriate actions before the actual RLF is declared.

Figure 8:
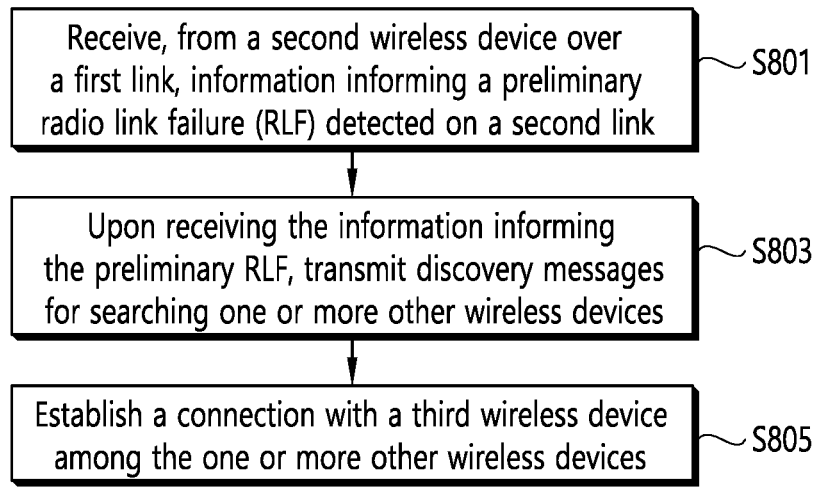
FIG. 8 shows an example of a method performed by a wireless device according to an embodiment of the present disclosure.

FIG. 8 shows an example of a method performed by a wireless device according to an embodiment of the present disclosure. Steps illustrated in FIG. 8 may also be performed by UE.

Referring to FIG. 8, in step S801, a first wireless device may receive, from a second wireless device over a first link, information informing a preliminary radio link failure (RLF) detected on a second link. The preliminary RLF may be detected on the second link based on that a relaxed condition with respect to the RLF condition for detecting an RLF on the second link is satisfied. The first link may be a link between the first wireless device and the second wireless device. The second link may be a link between the second wireless device and a node other than the first wireless device.

In step S803, the first wireless device may transmit discovery messages for searching one or more other wireless devices, upon receiving the information informing the preliminary RLF.

In step S805, the first wireless device may establish a connection with a third wireless device among the one or more other wireless devices.

According to various embodiments, the node may comprise a base station, and the second link comprises an access link.

According to various embodiments, the RLF condition comprise at least one of a first condition, a second condition or a third condition. The first condition is a condition that i) consecutive out-of-synchronization (sync) indications of a threshold out-of-sync number are identified for a cell related to the base station, upon which an RLF timer starts, ii) consecutive in-sync indications of a threshold in-sync number are not identified for the cell related to the base station while the RLF timer is running, and iii) the RLF timer expires. The second condition may be a condition that a random access problem is identified for the cell related to the base station. The third condition may be a condition that a maximum number of retransmissions has been reached for the cell related to the base station.

According to various embodiments, the relaxed condition may be satisfied upon starting the RLF timer.

According to various embodiments, the relaxed condition may comprises the first condition with the threshold in-sync number set to a lower value.

According to various embodiments, the relaxed condition may comprise the third condition with the maximum number of retransmissions set to a lower value.

According to various embodiments, the node may comprise a fourth wireless device, and the second link comprises a sidelink.

According to various embodiments, the RLF condition may comprise a sidelink RLF condition that a number of consecutive discontinuous transmissions (DTXs) on the second link reaches a maximum consecutive DTX number configured by a network.

According to various embodiments, the relaxed condition may comprise the sidelink RLF condition with the maximum consecutive DTX number set to a lower value.

According to various embodiments, the relaxed condition may be satisfied based on that a number of consecutive negative-acknowledgements (NACKs) on the second link during a time period reaches a maximum consecutive NACK number configured by a network.

According to various embodiments, upon receiving the information informing the preliminary RLF, the first wireless device may monitor an access link to search a cell. The first wireless device may establish a connection with the cell.

According to various embodiments, upon receiving the information informing the preliminary RLF, the first wireless device may perform a transmission resource reselection. The first wireless device may perform a transmission on a resource determined based on the transmission resource reselection.

According to various embodiments, a processor for a first wireless device in a wireless communication system may execute instructions which are implemented by a software code stored in a memory of the first wireless device. The instructions may, when executed by the processor, perform operations comprising: receiving, from a second wireless device over a first link, information informing a preliminary radio link failure (RLF) detected on a second link; upon receiving the information informing the preliminary RLF, transmitting discovery messages for searching one or more other wireless devices; and establishing a connection with a third wireless device among the one or more other wireless devices. The preliminary RLF may be detected on the second link based on that a relaxed condition with respect to the RLF condition for detecting an RLF on the second link is satisfied. The first link may be a link between the first wireless device and the second wireless device. The second link may be a link between the second wireless device and a node other than the first wireless device.

According to various embodiments, a non-transitory computer-readable medium may have stored thereon a plurality of instructions. The plurality of instructions, when executed by a processor of a first wireless device, cause the first wireless device to: receive, from a second wireless device over a first link, information informing a preliminary radio link failure (RLF) detected on a second link; upon receiving the information informing the preliminary RLF, transmit discovery messages for searching one or more other wireless devices; and establish a connection with a third wireless device among the one or more other wireless devices. The preliminary RLF may be detected on the second link based on that a relaxed condition with respect to the RLF condition for detecting an RLF on the second link is satisfied. The first link may be a link between the first wireless device and the second wireless device. The second link may be a link between the second wireless device and a node other than the first wireless device.

wherein the preliminary RLF is detected on the second link based on that a relaxed condition with respect to the RLF condition for detecting an RLF on the second link is satisfied, wherein the first link is a link between the first wireless device and the second wireless device, and wherein the second link is a link between the second wireless device and a node other than the first wireless device.

Figure 9:
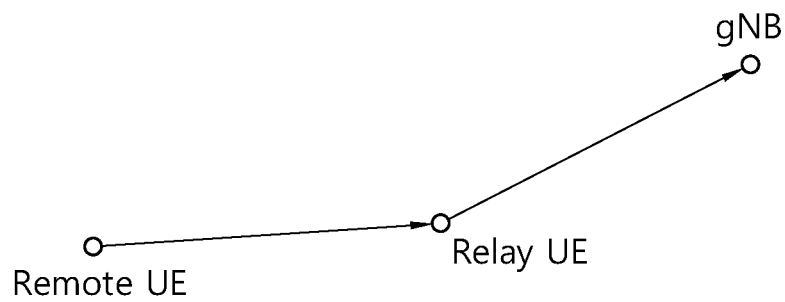
FIG. 9 shows an example of a UE-to-network relay operation according to an embodiment of the present disclosure.

FIG. 9 shows an example of a UE-to-network relay operation according to an embodiment of the present disclosure.

Referring to FIG. 9, remote UE may perform an indirect communication with gNB via relay UE. That is, an indirect connection is established between the remote UE and the gNB, via the relay UE. The indirect communication may be performed via an access link (or, Uu link) between the relay UE and the gNB, and a sidelink between the relay UE and the remote UE. The relay UE may relay a signal transfer between the gNB and the remote UE.

Due to a link failure on a Uu link between the relay UE and the gNB, the relay UE may declare an RLF. If the relay UE informs the remote UE of the RLF in advance (i.e., the relay UE informs the remote UE of pre-RLF), the remote UE can perform appropriate actions in advance. For example, the remote UE can perform a mobility to other relay UE or Uu link before the actual RLF on a Uu link between the relay UE and the gNB occurs so that a gain in terms of service continuity can be realized. In the present disclosure, pre-RLF signal may comprise a signal to notify a case in which link quality is quite degraded before the actual RLF is declared.

For example, if T310 timer is started on Uu link, the relay UE may declare pre-RLF and notify the pre-RLF to the remote UE. The T310 timer is a timer that is started if the number of consecutive out-of-syncs reaches a threshold number N310. If the number of consecutive in-syncs does not reach a threshold number N311 while the T310 timer is running and the T310 timer expires, the actual RLF may be declared.

For example, after the T310 timer is started on Uu link, the relay UE may declare pre-RLF and notify the pre-RLF to the remote UE if the number of consecutive in-syncs does not reach an in-sync threshold for pre-RLF while the T310 timer is running. Herein the in-sync threshold for pre-RLF may be set to be lower than the N311.

For example, the relay UE may declare pre-RLF and notify the pre-RLF to the remote UE if a threshold number of retransmissions has been reached for the cell related to the base station (i.e., ACK signal is not received until the threshold number of retransmissions has been reached for the cell related to the base station). Herein, the threshold number of retransmissions may be set to be lower than the maximum number of retransmissions in the third condition.

For example, the remote UE may be configured to, when the number of consecutive DTXs reaches a (pre)configured number while communicating with the relay UE, perform a search for a new relay UE. In this case, the remote UE can search a new relay UE for the remote UE to switch to in advance before a sidelink RLF on a sidelink between the remote UE and the relay UE is declared so that the remote UE can quickly switch to the new relay UE and thus service continuity can be maximally guaranteed although an actual sidelink RLF is declared on the sidelink between the remote UE and the relay UE. The (pre)configured number may be determined differently based on at least one of a service priority, service requirements or SL RSRP measurement value on a sidelink between the remote UE and the relay UE. The (pre)configured number may be set to be lower than a value used for declaring the actual sidelink RLF (i.e., sl-maxNumConsecutiveDTX). For example, the shorter latency is required by a service, a service requires, the lower (pre)configured number is set.

The relay UE which declared pre-RLF may perform a signalling for notifying the remote UE of the pre-RLF (i.e., pre-RLF signalling). The pre-RLF signalling may be transmitted via PC5-RRC or MAC CE. The pre-RLF signalling may be a signalling indicating that RLF is likely to occur on the current Uu link before the actual RLF occurs.

For example, the remote UE which received the pre-RLF signalling may trigger a monitoring of Uu link signal and/or sidelink signal.

For example, the remote UE which received the pre-RLF signalling may trigger a searching of candidate relay UEs.

For example, the remote UE which received the pre-RLF signalling may broadcast a solicitation discovery message for searching new candidate relay UEs.

For example, the remote UE which received the pre-RLF signalling may perform a cell search and switch to a new path.

For example, the remote UE which received the pre-RLF signalling may trigger a relay reselection.

For example, the remote UE which received the pre-RLF signalling may trigger a transmission resource (re)selection.

Remote UE can also detect a pre-RLF by using a method the relay UE uses to detect the pre-RLF as described above. If the remote UE detects pre-RLF, the remote UE may report the pre-RLF to the relay UE.

Figure 10:
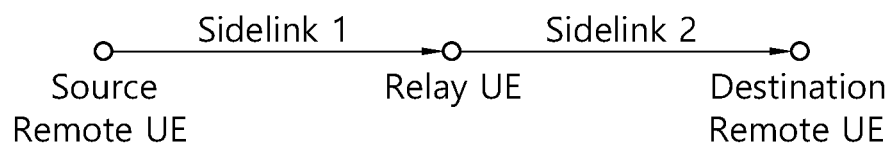
FIG. 10 shows an example of a UE-to-UE relay operation according to an embodiment of the present disclosure.

FIG. 10 shows an example of a UE-to-UE relay operation according to an embodiment of the present disclosure.

Referring to FIG. 10, source remote UE may perform an indirect communication with a destination remote UE via relay UE. That is, an indirect connection is established between the source remote UE and the destination remote UE, via the relay UE. The indirect communication may be performed via a sidelink between the relay UE and the destination remote UE, and a sidelink between the relay UE and the source remote UE. The relay UE may relay a signal transfer between the source remote UE and the destination remote UE.

For example, if the number of consecutive DTXs on a sidelink reaches a (pre)configured number, the relay UE may declare a pre-RLF. The (pre)configured number may be set to be lower than the threshold number (i.e., sl-maxNumConsecutiveDTX) used for detecting the actual sidelink RLF. Therefore, the relay UE may detect that sidelink is unstable before declaring the actual sidelink RLF. For example, if the threshold number (i.e., sl-maxNumConsecutiveDTX) used for detecting the actual sidelink RLF is set to 10, the (pre)configured number used for detecting the pre-RLF may be set to 7.

For example, the number of consecutive NACKs for declaring the pre-RLF (e.g., K) may be configured. If the (average) number of consecutive NACKs during a predetermined time period reaches K, the relay UE may declare the pre-RLF.

The relay UE which declared the pre-RLF may need to perform a signalling for notifying the source remote UE of the pre-RLF (i.g., sidelink pre-RLF signalling). The sidelink pre-RLF signalling may be transmitted via PC5-RRC and/or MAC CE.

For example, the source remote UE which received the sidelink pre-RLF signalling may trigger a monitoring of Uu link signal and/or sidelink signal.

For example, the source remote UE which received the sidelink pre-RLF signalling may trigger a searching of candidate relay UEs.

For example, the source remote UE which received the sidelink pre-RLF signalling may broadcast a solicitation discovery message for searching new candidate relay UEs.

For example, the source remote UE which received the sidelink pre-RLF signalling may perform a cell search and switch to a new path.

For example, the source remote UE which received the sidelink pre-RLF signalling may trigger a relay reselection.

For example, the source remote UE which received the sidelink pre-RLF signalling may trigger a transmission resource (re)selection.

Source remote UE can also detect a pre-RLF by using a method the relay UE uses to detect the pre-RLF as described above. If the source remote UE detects pre-RLF, the source remote UE may report the pre-RLF to the relay UE.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 11:
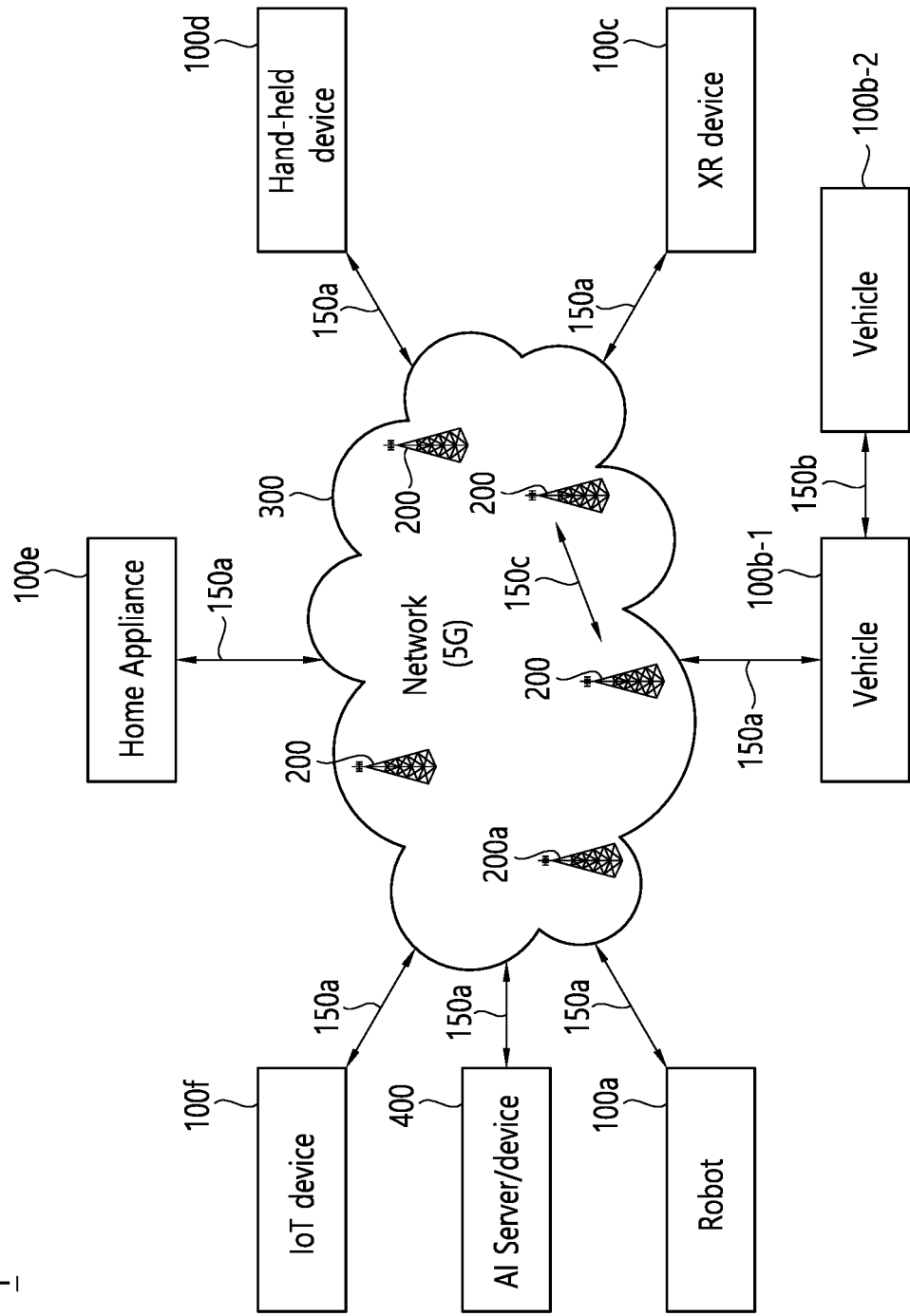
FIG. 11 shows a communication system 1, according to an embodiment of the present disclosure.

FIG. 11 shows a communication system 1, according to an embodiment of the present disclosure.

Referring to FIG. 11, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 12:
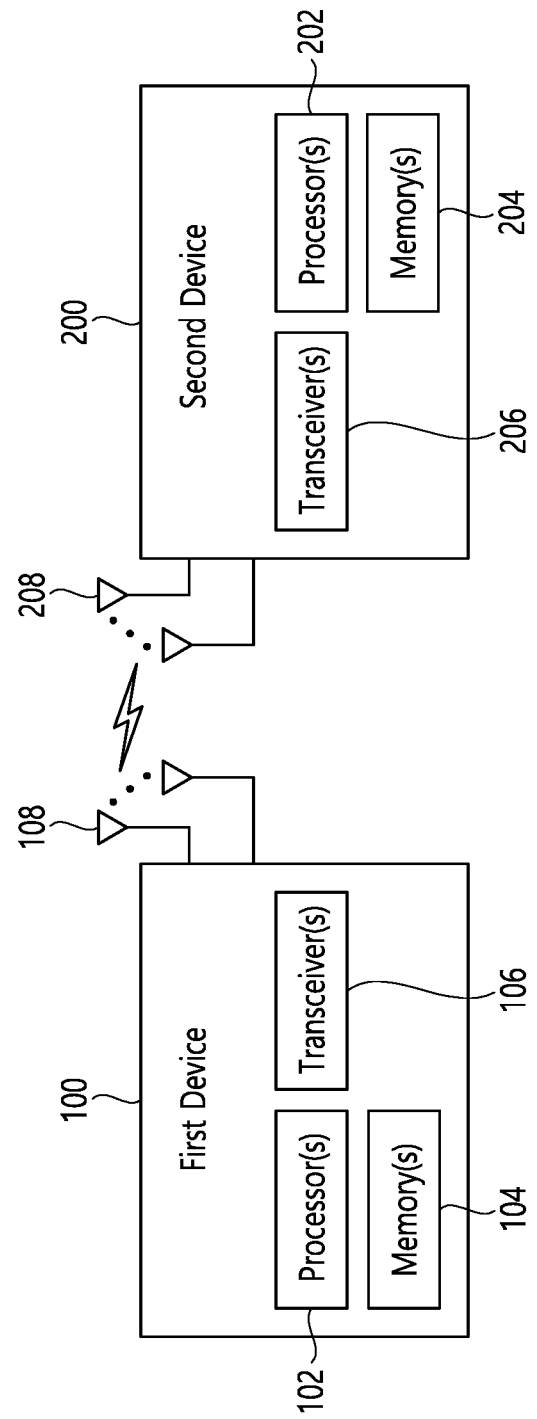
FIG. 12 shows wireless devices, according to an embodiment of the present disclosure.

FIG. 12 shows wireless devices, according to an embodiment of the present disclosure.

Referring to FIG. 12, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 11.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, the first wireless device 100 and/or one or more processors 120 may be configured to implement steps performed by the wireless device/UE. For example, the one or more processors 120 may be configured to control the one or more transceivers 106 to receive, from a second wireless device over a first link, information informing a preliminary radio link failure (RLF) detected on a second link. Upon receiving the information informing the preliminary RLF, the one or more processors 120 may be configured to control the one or more transceivers 106 to transmit discovery messages for searching one or more other wireless devices. The one or more processors 120 may be configured to establish a connection with a third wireless device among the one or more other wireless devices. The preliminary RLF may be detected on the second link based on that a relaxed condition with respect to the RLF condition for detecting an RLF on the second link is satisfied. The first link may be a link between the first wireless device and the second wireless device. The second link may be a link between the second wireless device and a node other than the first wireless device.

Figure 13:
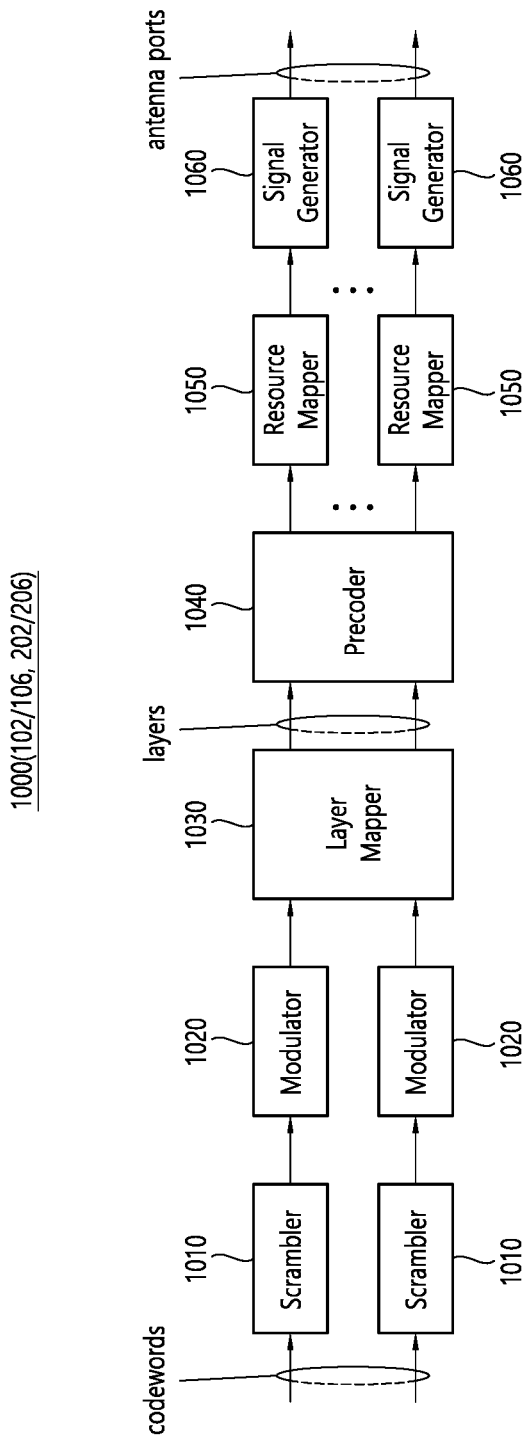
FIG. 13 shows a signal process circuit for a transmission signal, according to an embodiment of the present disclosure.

FIG. 13 shows a signal process circuit for a transmission signal, according to an embodiment of the present disclosure.

Referring to FIG. 13, a signal processing circuit 1000 may include scramblers 1010, modulators 1020, a layer mapper 1030, a precoder 1040, resource mappers 1050, and signal generators 1060. An operation/function of FIG. 13 may be performed, without being limited to, the processors 102 and 202 and/or the transceivers 106 and 206 of FIG. 12. Hardware elements of FIG. 13 may be implemented by the processors 102 and 202 and/or the transceivers 106 and 206 of FIG. 12. For example, blocks 1010 to 1060 may be implemented by the processors 102 and 202 of FIG. 12. Alternatively, the blocks 1010 to 1050 may be implemented by the processors 102 and 202 of FIG. 12 and the block 1060 may be implemented by the transceivers 106 and 206 of FIG. 12.

Codewords may be converted into radio signals via the signal processing circuit 1000 of FIG. 13. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 13. For example, the wireless devices (e.g., 100 and 200 of FIG. 12) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 14:
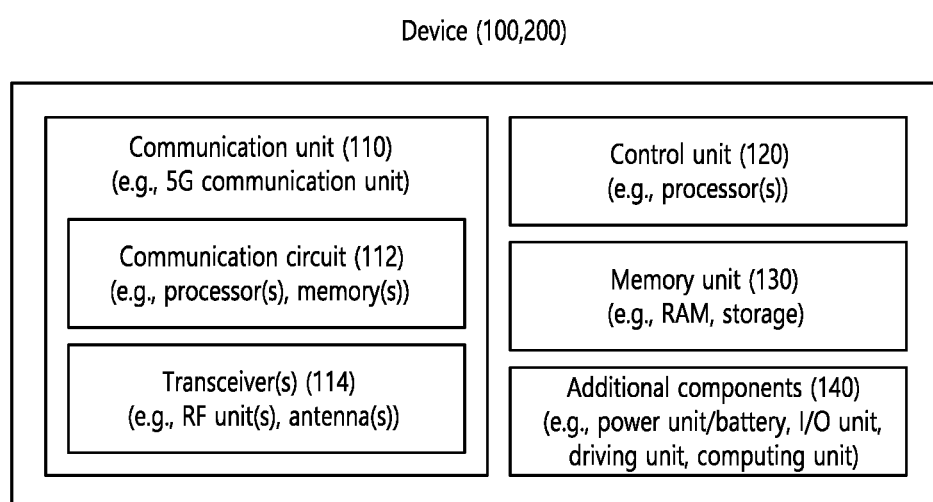
FIG. 14 shows another example of a wireless device, according to an embodiment of the present disclosure.

FIG. 14 shows another example of a wireless device, according to an embodiment of the present disclosure. The wireless device may be implemented in various forms according to a use-case/service (refer to FIG. 11).

Referring to FIG. 14, wireless devices 100 and 200 may correspond to the wireless devices 100 and 200 of FIG. 12 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 12. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 11), the vehicles (100b-1 and 100b-2 of FIG. 11), the XR device (100c of FIG. 11), the hand-held device (100d of FIG. 11), the home appliance (100e of FIG. 11), the IoT device (100f of FIG. 11), a digital broadcast terminal, a hologram device, a public safety device, an MTC device, a medicine device, a fintech device (or a finance device), a security device, a climate/environment device, the AI server/device (400 of FIG. 11), the BSs (200 of FIG. 11), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 14 will be described in detail with reference to the drawings.

Figure 15:
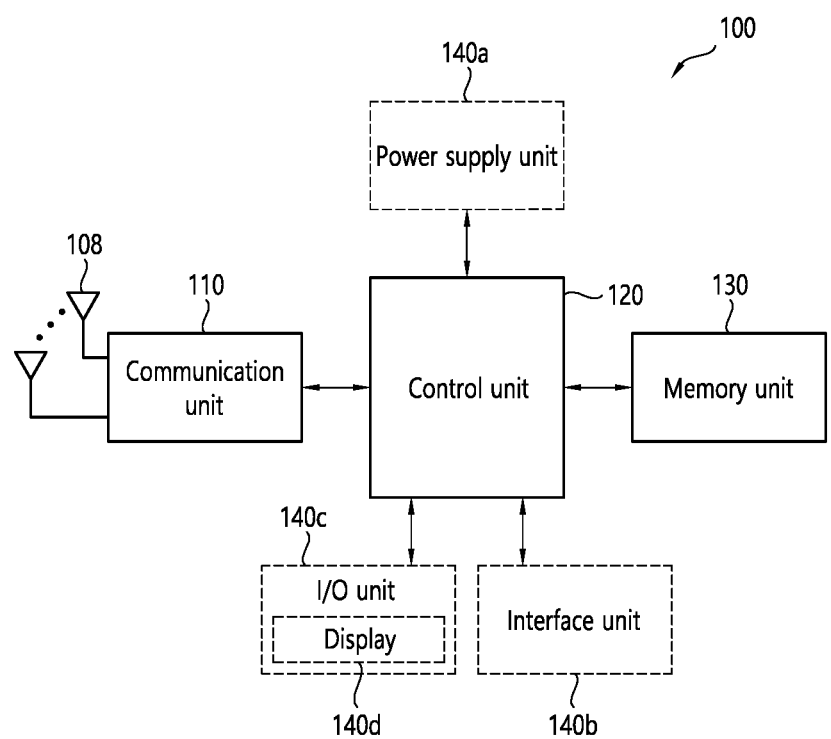
FIG. 15 shows a hand-held device, according to an embodiment of the present disclosure.

FIG. 15 shows a hand-held device, according to an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 15, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 14, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 16:
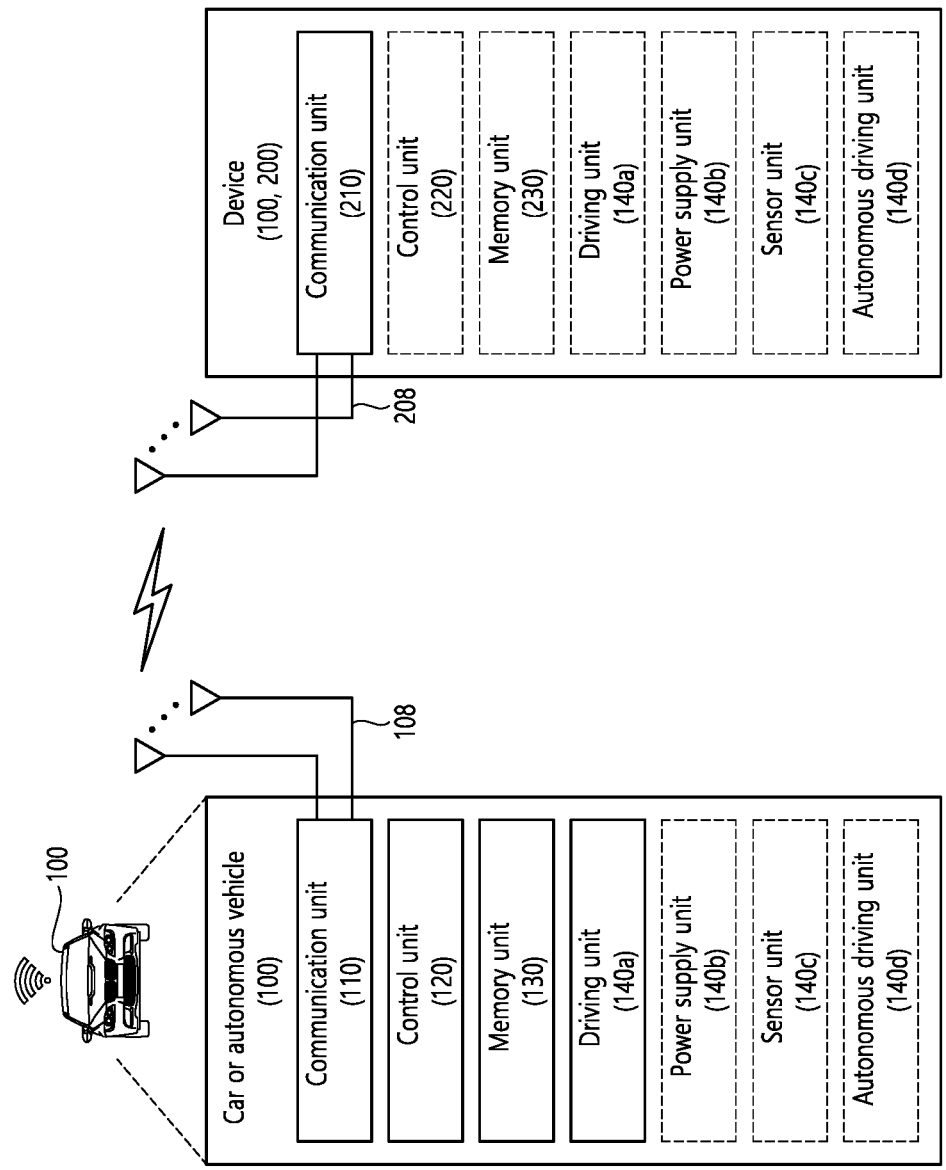
FIG. 16 shows a vehicle or an autonomous vehicle, according to an embodiment of the present disclosure.

FIG. 16 shows a vehicle or an autonomous vehicle, according to an embodiment of the present disclosure. The vehicle or autonomous vehicle may be implemented by a mobile robot, a car, a train, a manned/unmanned Aerial Vehicle (AV), a ship, etc.

Referring to FIG. 16, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

According to various embodiments, a remote UE can search a new link before a link failure occurs so that a service continuity, latency and/or reliability can be enhanced.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first wireless device in a wireless communication system, the method comprising:
   receiving, from a second wireless device over a first link, information informing a preliminary radio link failure (RLF) detected on a second link;
   upon receiving the information informing the preliminary RLF, transmitting discovery messages for searching one or more other wireless devices; and
   establishing a connection with a third wireless device among the one or more other wireless devices,
   wherein the preliminary RLF is detected on the second link based on that a relaxed condition with respect to the RLF condition for detecting an RLF on the second link is satisfied,
   wherein the first link is a link between the first wireless device and the second wireless device, and
   wherein the second link is a link between the second wireless device and a node other than the first wireless device.

2. The method of claim 1, wherein the node comprises a base station, and the second link comprises an access link.

3. The method of claim 2, wherein the RLF condition comprises at least one of:
   a first condition that i) consecutive out-of-synchronization (sync) indications of a threshold out-of-sync number are identified for a cell related to the base station, upon which an RLF timer starts, ii) consecutive in-sync indications of a threshold in-sync number are not identified for the cell related to the base station while the RLF timer is running, and iii) the RLF timer expires;
   a second condition that a random access problem is identified for the cell related to the base station; or
   a third condition that a maximum number of retransmissions has been reached for the cell related to the base station.

4. The method of claim 3, wherein the relaxed condition is satisfied upon starting the RLF timer.

5. The method of claim 3, wherein the relaxed condition comprises the first condition with the threshold in-sync number set to a lower value.

6. The method of claim 3, wherein the relaxed condition comprises the third condition with the maximum number of retransmissions set to a lower value.

7. The method of claim 1, wherein the node comprises a fourth wireless device, and the second link comprises a sidelink.

8. The method of claim 7, wherein the RLF condition comprises a sidelink RLF condition that a number of consecutive discontinuous transmissions (DTXs) on the second link reaches a maximum consecutive DTX number configured by a network.

9. The method of claim 8, wherein the relaxed condition comprises the sidelink RLF condition with the maximum consecutive DTX number set to a lower value.

10. The method of claim 7, wherein the relaxed condition is satisfied based on that a number of consecutive negative-acknowledgements (NACKs) on the second link during a time period reaches a maximum consecutive NACK number configured by a network.

11. The method of claim 1, further comprising:
    upon receiving the information informing the preliminary RLF, monitoring an access link to search a cell; and
    establishing a connection with the cell.

12. The method of claim 1, further comprising:
upon receiving the information informing the preliminary RLF, performing a transmission resource reselection; and
performing a transmission on a resource determined based on the transmission resource reselection.

13. The method of claim 1, wherein the first wireless device is in communication with at least one of a user equipment, a network, or autonomous vehicles other than the first wireless device.

14. A wireless device in a wireless communication system comprising:
a transceiver;
a memory; and
at least one processor operatively coupled to the transceiver and the memory, and configured to:
control the transceiver to receive, from a second wireless device over a first link, information informing a preliminary radio link failure (RLF) detected on a second link;
upon receiving the information informing the preliminary RLF, control the transceiver to transmit discovery messages for searching one or more other wireless devices; and
establish a connection with a third wireless device among the one or more other wireless devices,
wherein the preliminary RLF is detected on the second link based on that a relaxed condition with respect to the RLF condition for detecting an RLF on the second link is satisfied,
wherein the first link is a link between the first wireless device and the second wireless device, and
wherein the second link is a link between the second wireless device and a node other than the first wireless device.

15. A non-transitory computer-readable medium having stored thereon a plurality of instructions, wherein the plurality of instructions, when executed by a processor of a wireless device, cause the wireless device to:
receive, from a second wireless device over a first link, information informing a preliminary radio link failure (RLF) detected on a second link;
upon receiving the information informing the preliminary RLF, transmit discovery messages for searching one or more other wireless devices; and
establish a connection with a third wireless device among the one or more other wireless devices,
wherein the preliminary RLF is detected on the second link based on that a relaxed condition with respect to the RLF condition for detecting an RLF on the second link is satisfied,
wherein the first link is a link between the first wireless device and the second wireless device, and
wherein the second link is a link between the second wireless device and a node other than the first wireless device.

* * * * *